United States Patent
Kapil et al.

(10) Patent No.: US 8,788,789 B2
(45) Date of Patent: Jul. 22, 2014

(54) POWER FILTER IN DATA TRANSLATION LOOK-ASIDE BUFFER BASED ON AN INPUT LINEAR ADDRESS

(75) Inventors: Deepika Kapil, Cupertino, CA (US); David Hugh McIntyre, Sunnyvale, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 696 days.

(21) Appl. No.: 12/968,613

(22) Filed: Dec. 15, 2010

(65) Prior Publication Data

US 2012/0159056 A1     Jun. 21, 2012

(51) Int. Cl.
*G06F 9/34*     (2006.01)

(52) U.S. Cl.
USPC .......................................... 711/207

(58) Field of Classification Search
USPC .......................................... 711/207
See application file for complete search history.

(56) References Cited

U.S. PATENT DOCUMENTS

| | | | | |
|---|---|---|---|---|
| 8,429,378 B2* | 4/2013 | Ingle et al. | | 711/208 |
| 2006/0277390 A1* | 12/2006 | Zuraski et al. | | 711/207 |
| 2007/0268747 A1* | 11/2007 | Lin et al. | | 365/185.07 |
| 2008/0114940 A1* | 5/2008 | Ito | | 711/128 |
| 2011/0029755 A1* | 2/2011 | Naruse | | 711/206 |
| 2011/0231593 A1* | 9/2011 | Yasufuku et al. | | 711/3 |

OTHER PUBLICATIONS

John L. Hennessy, David A. Patterson, "Computer Architecture: A Quantitative Approach", Morgan Kaufmann; 4th edition (2006) pp. 288-293 and 326-331.

David A. Patterson, John L. Hennessy, "Computer Organization and Design: The Hardware/Software Interface", Morgan Kaufmann; 4th edition (2008) pp. 502-507.

* cited by examiner

*Primary Examiner* — April Y Blair
*Assistant Examiner* — Prasith Thammavong
(74) *Attorney, Agent, or Firm* — Volpe and Koenig, P.C.

(57) ABSTRACT

A method and an apparatus for power filtering in a Translation Look-aside Buffer (TLB) are described. In the method and apparatus, power consumption reduction is achieved by suppressing physical address (PA) reads from random access memory (RAM) if the previously translated linear address (LA), or virtual address (VA), is the same as the currently requested LA. To provide the correct translation, the output of the TLB is maintained if the previously translated LA and the LA currently requested for translation are the same.

17 Claims, 8 Drawing Sheets

POWER FILTER IN DATA TRANSLATION LOOK-ASIDE BUFFER BASED ON AN INPUT LINEAR ADDRESS

FIELD OF INVENTION

This application is related to processor technology and, in particular, memory address translation.

BACKGROUND

FIG. 1 shows an embodiment of a processor 100. The processor 100 may be any one of a variety of processors such as a central processing unit (CPU) or a graphics processing unit (GPU). For instance, they may be x86 microprocessors that implement x86 64-bit instruction set architecture and are used in desktops, laptops, servers, and superscalar computers, or they may be Advanced RISC (Reduced Instruction Set Computer) Machines (ARM) processors that are used in mobile phones or digital media players. Other embodiments of the processors are contemplated, such as digital signal processors (DSP) that are particularly useful in the processing and implementation of algorithms related to digital signals, such as voice data and communication signals, and microcontrollers that are useful in consumer applications, such as printers and copy machines.

The processor 100 operates by executing instructions on data values stored in memory. Examples of instructions that operate on data values are additions, subtractions, logical conjunctions (ANDs), logical disjunctions (ORs), and shifting and rotating binary numbers. Processor 100 may also be capable of performing other instructions, such as moving and copying data values from one memory location to another. Modern processors are capable of performing many millions of these instructions per second, the collection of which, for instance, causes a GPU to produce images for display on a computer screen or to enable the usage of a word processing program in a desktop computer.

The processor 100 includes execution units 110 which are computational cores of the processor and are responsible for executing the instructions or commands issued to the processor 100. Execution units 110 operate on data values stored in a system memory and produce results and outcomes that may be written back to memory thereafter.

Processor 100 is equipped with a load and store unit 120 that is coupled to the execution units 110, and is responsible for managing loading and storing data operated on by the execution units 110. The load and store unit 120 brings memory data to the execution units 110 to process and later store the results of these operations in memory. Processor 100 is also equipped with a Level 1 (L1) data cache 130 which stores data for access by the processor 100. L1 data cache 130 is advantageous because of the small amount of delay that a load and store unit 120 experiences in accessing its data.

In most processors it is costly (in terms of silicon design) to store all the data the processor operates on in easily-accessible L1 caches. Processors usually have a hierarchy of memory storage locations. Small but fast storage locations are expensive to implement but offer fast memory access, while large but slower storage locations are cheaper to implement, but offer slower memory access. A processor has to wait to obtain data from these large storage locations and therefore its performance is slowed.

FIG. 2 shows a memory hierarchy of a processor, such as processor 100. Registers represent the fastest memory to access, however, in some instances they may only provide 100 Bytes of register space. Hard drives are the slowest in term of memory access speed, but are both cheap to implement and offer very large storage space, e.g., 1 TeraByte (TB) or more. Level 1 (L1) through Level 3 (L3) caches range from several kilobytes (kBs) in size to 16 megabytes (MBs) or more, depending on the computer system.

Data stored in memory is organized and indexed by memory addresses. For instance, addressing 4 kB of data requires 4*1024=4096 distinct memory addresses, where each memory address holds a Byte (eight bits or an octet) of data. Therefore, to completely reference the memory addresses of a 4 kB memory, a minimum of 12 bits are required. Processors also use a system of paging in addressing memory locations, where memory is sectioned in pages of memory addresses. For instance, a processor may use a 4 kB page system in sectioning memory and therefore may be able to point to a memory location within a page using 12 bits. On the other hand, a page may be comprised of 1 MegaByte (MB) of data in which case, 20 bits are required to point to each of the 1048576 (1024*1024) distinct addresses within the page.

Further, many pages may be indexed in order to completely cover the memory locations that are accessible to the processor. For instance, if the processor memory hierarchy includes 256 GigaBytes (GB) of data and a 4 kB paging system is used, then the memory system comprises 256*1024*256 which is 67108864 pages. Therefore, 8+10+8=26 bits are further required to identify each of the 67108864 pages in the memory system. FIG. 3 graphically illustrates this example, where a 38-bit memory address comprises a 26-bit page address and a 12-bit Byte index within the page. This memory address of FIG. 3 is hereinafter referred to as a physical address (PA), to be distinguished from a linear address (LA) or a virtual address (VA). As will be described herein, a PA format is an external format, whereas a LA format is an internal processor address format.

It is desirable to have a method and an apparatus that efficiently translates LAs to PAs. It is also desirable to have a memory address translation device, such as a Translation Look-aside Buffer (TLB), that translates LAs to PAs in a power-efficient way.

SUMMARY OF THE EMBODIMENTS

Embodiments of a method and apparatus for reducing power consumption in a memory address translation device, such as a Translation Look-aside Buffer (TLB) are provided. In a method and apparatus, reading a physical address (PA) corresponding to a received linear address (LA) is suppressed if a previously translated LA is the same as the received LA. Additionally, the PA corresponding to the previously translated LA is maintained as an output if the previously translated LA is the same as the received LA.

In some embodiments, the received LA is compared with a previously translated LA by passing the previously translated LA through a flip-flop and equating the previously translated LA with the received LA to determine if they are the same. In other embodiments, a Static Random Access Memory (SRAM) holds PA translations and PA address translation is an output of the SRAM. In yet other embodiments, a content addressable memory (CAM) is used to hold LAs which are capable of being translated by the TLB.

BRIEF DESCRIPTION OF THE DRAWINGS

A more detailed understanding may be had from the following description, given by way of example in conjunction with the accompanying drawings wherein.

DETAILED DESCRIPTION

Figure 1:
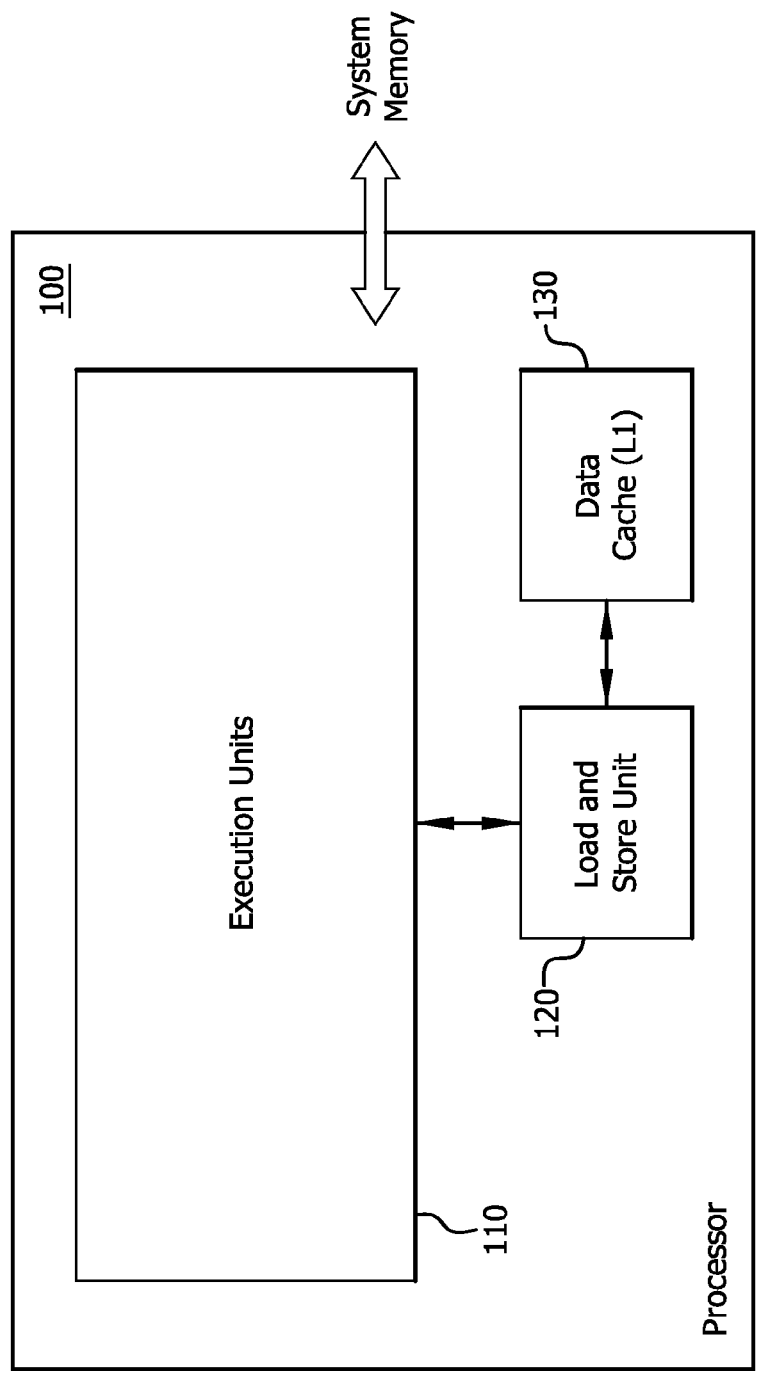
FIG. 1 is an embodiment of a processor.
Figure 2:
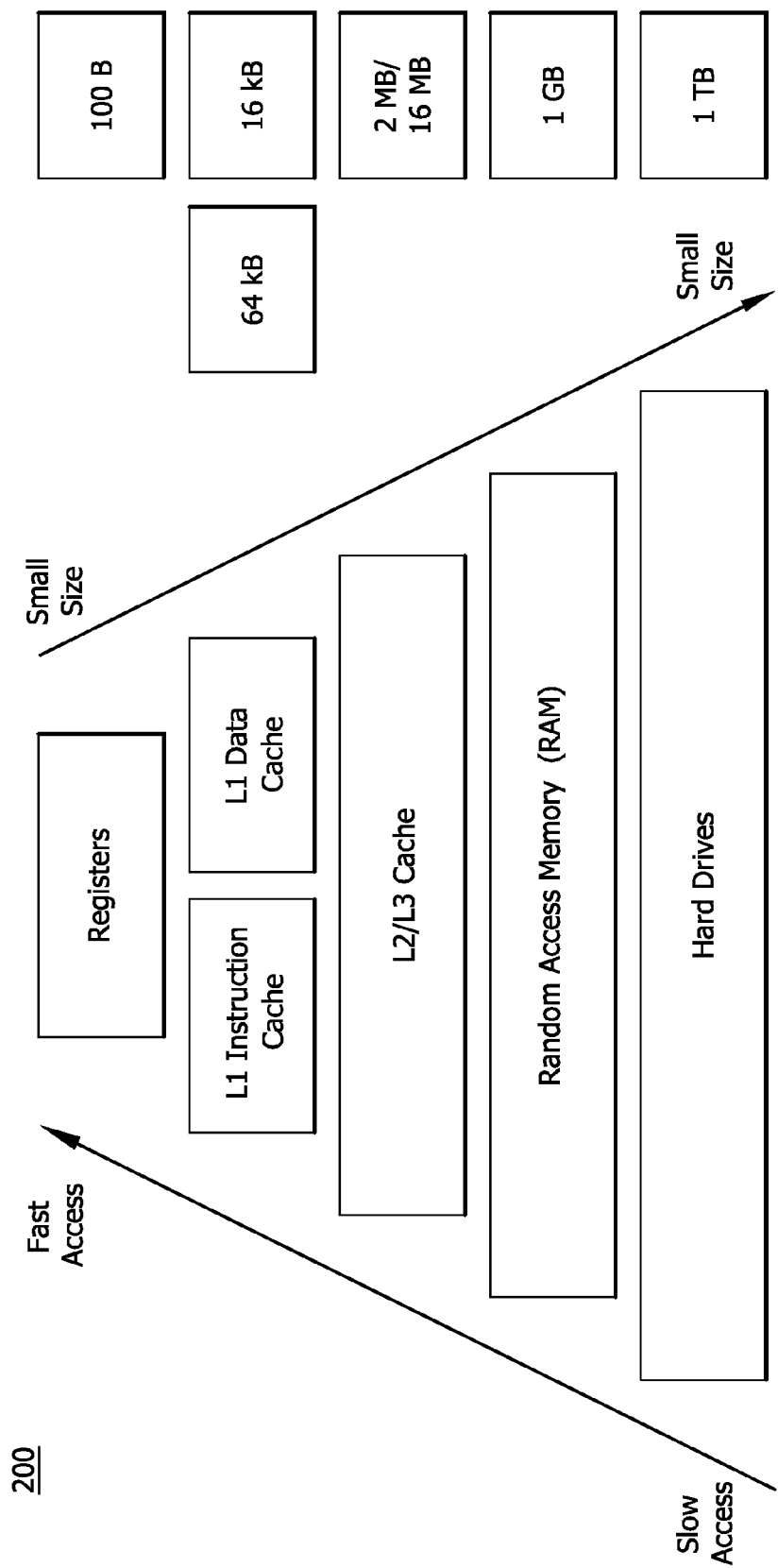
FIG. 2 is an exemplary processor memory hierarchy.
Figure 3:
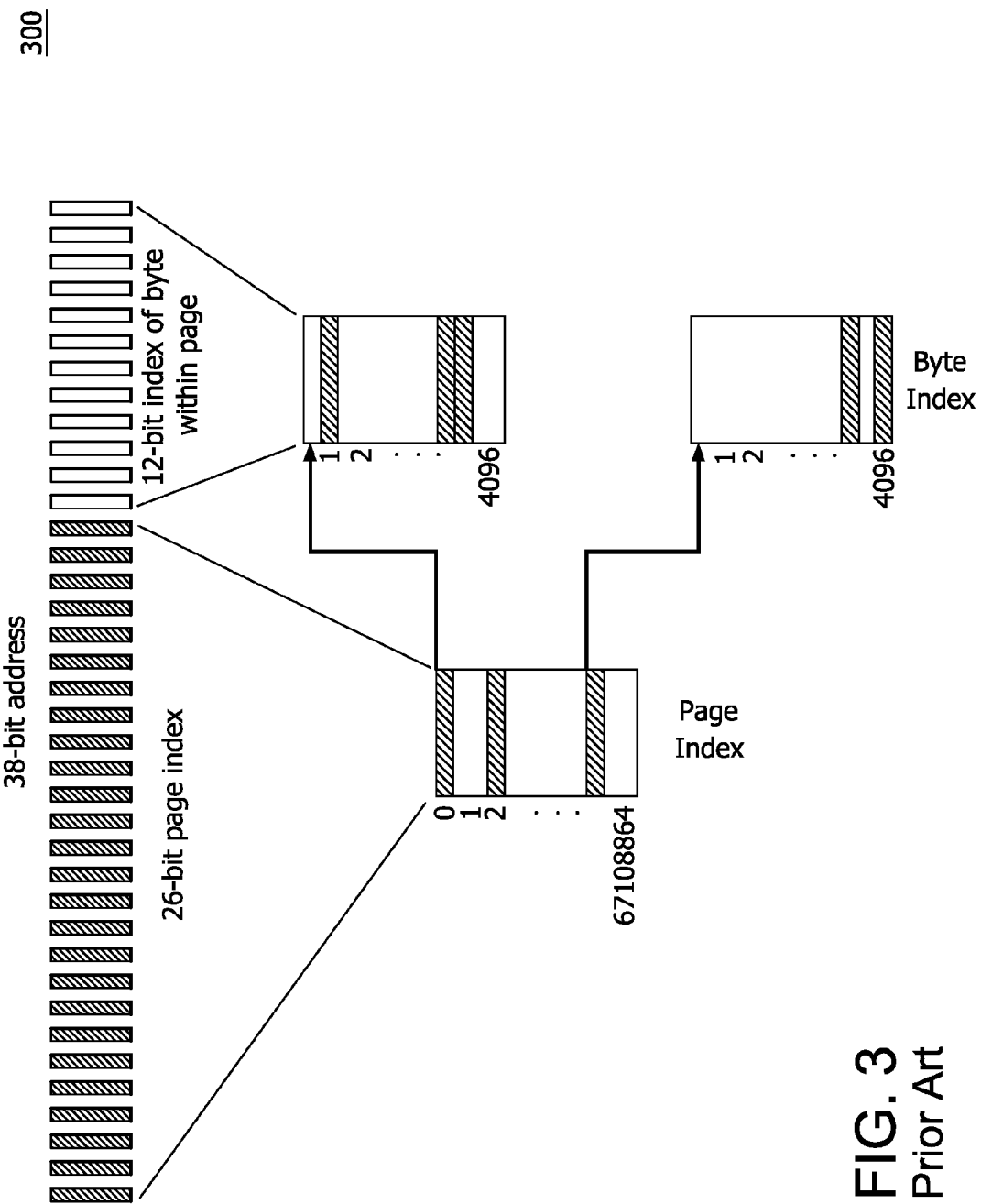
FIG. 3 is an instance of a memory physical address (PA)
Figure 4:
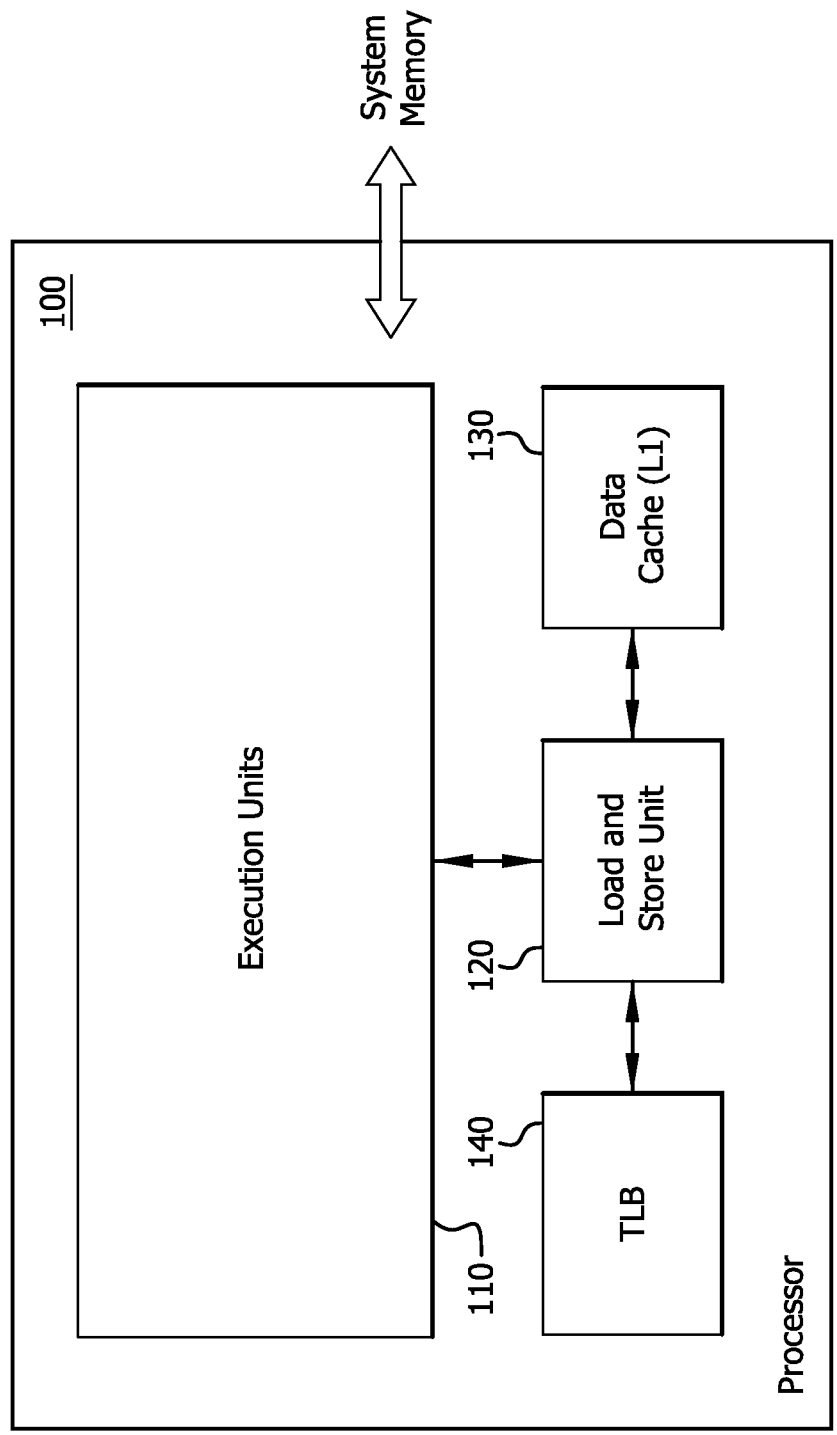
FIG. 4 is an embodiment of a processor.

Turning now to an embodiment of a processor 100 shown in FIG. 4. The processor 100 has execution units 110 that operate on memory values. The processor 100 is coupled to a load and store unit 120 which is responsible for obtaining memory values for the execution units 110 to operate on and later store these memory values.

Many processors, such as processor 100, reference memory address locations according to linear addresses (LAs), also referred to as virtual addresses (VAs). Internally within the processor 100, execution units 110 use a different format for address than is used for the external addressing format of physical addresses (PAs) discussed above. Where a computer system, for instance, has more than one processor associated with it, it is useful for there to be a physical address for data that is used by all the processors. However, there is also a linear address or a virtual address that is used within each processor, its respective execution units, and load and store unit.

When a processor 100 receives an instruction to operate on memory values, it will be aware of the internal linear address associated with the data needed. However, the processor will need to translate the linear address to a physical address in order to access the data. This translation is usually performed by means of a memory address translation device such as a Translation Look-aside Buffer (TLB) 140, also referred to as a data TLB (dTLB). Thus the TLB 140 in FIG. 4 is responsible for translating the internal format memory addresses (linear addresses) to external format memory addresses (physical addresses).

Figure 5:
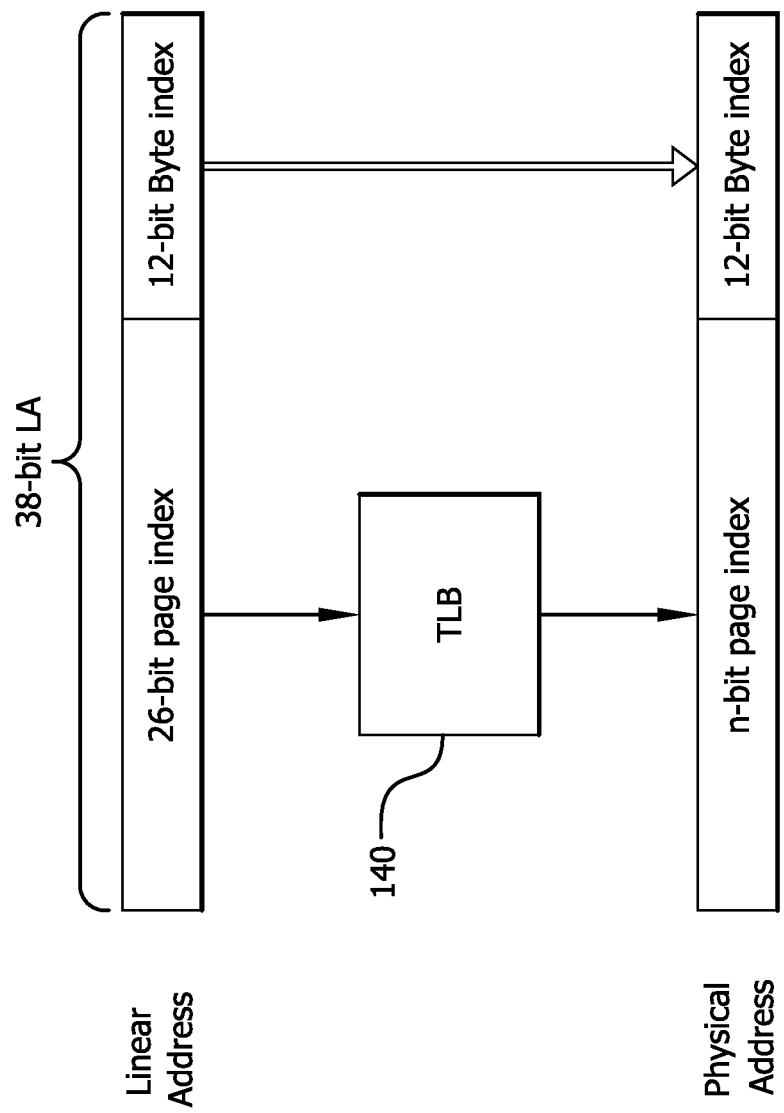
FIG. 5 is a translation look-aside buffet (TLB) input and output.

FIG. 5 is an embodiment which graphically shows the operation of TLB 140, where a 38-bit linear address that is composed of a 12-bit Byte index (for a 4 kB paging system) and a 26-bit page index is translated by means of TLB 140 to a physical address. In this embodiment 500, the 12-bit Byte index is identical for both the LA and the PA, and therefore does not get translated through the TLB 140. But the 26-bit LA page index is translated into an n-bit PA page index using the TLB 140, where n may be any number of bits.

In general a TLB, however, does not contain linear to physical address translations for all page addresses. Instead, in order to reduce searching time and optimize the performance of a TLB, only the translations of a subset of LAs to PAs is maintained. Some TLBs, for instance, may only contain translations for a set of the m addresses, where m may be any number (e.g. 16, 32, 36, or 40) of most recently used LAs. In the event where the TLB is not capable of translating a LA to a PA because the LA-to-PA translation is not among the set of m translations retained, a "TLB miss" is declared. A processor has a variety of relatively time-consuming alternatives to translate the LA into a PA in a process referred to in the art as a "page walk". In some embodiments, a TLB will update its list of addresses capable of being translated with recently used translations and may use a Least Recently Used (LRU) replacement scheme to keep the TLB translations up-to-date and relevant to the needs of the processor.

Those skilled in the art will recognize that a TLB offers many performance advantages for a processor. First, maintaining a subset of LA-to-PA translations, instead of an entire library of translations, speeds up the operation of a TLB as it reduces searching time. Although the time requirement in translating LAs that result in a TLB miss is high, TLB misses do not occur very frequently because memory access is relatively localized in both time and space. Generally, at a particular point in time processors access data in the same regions or pages of memory.

Figure 6:
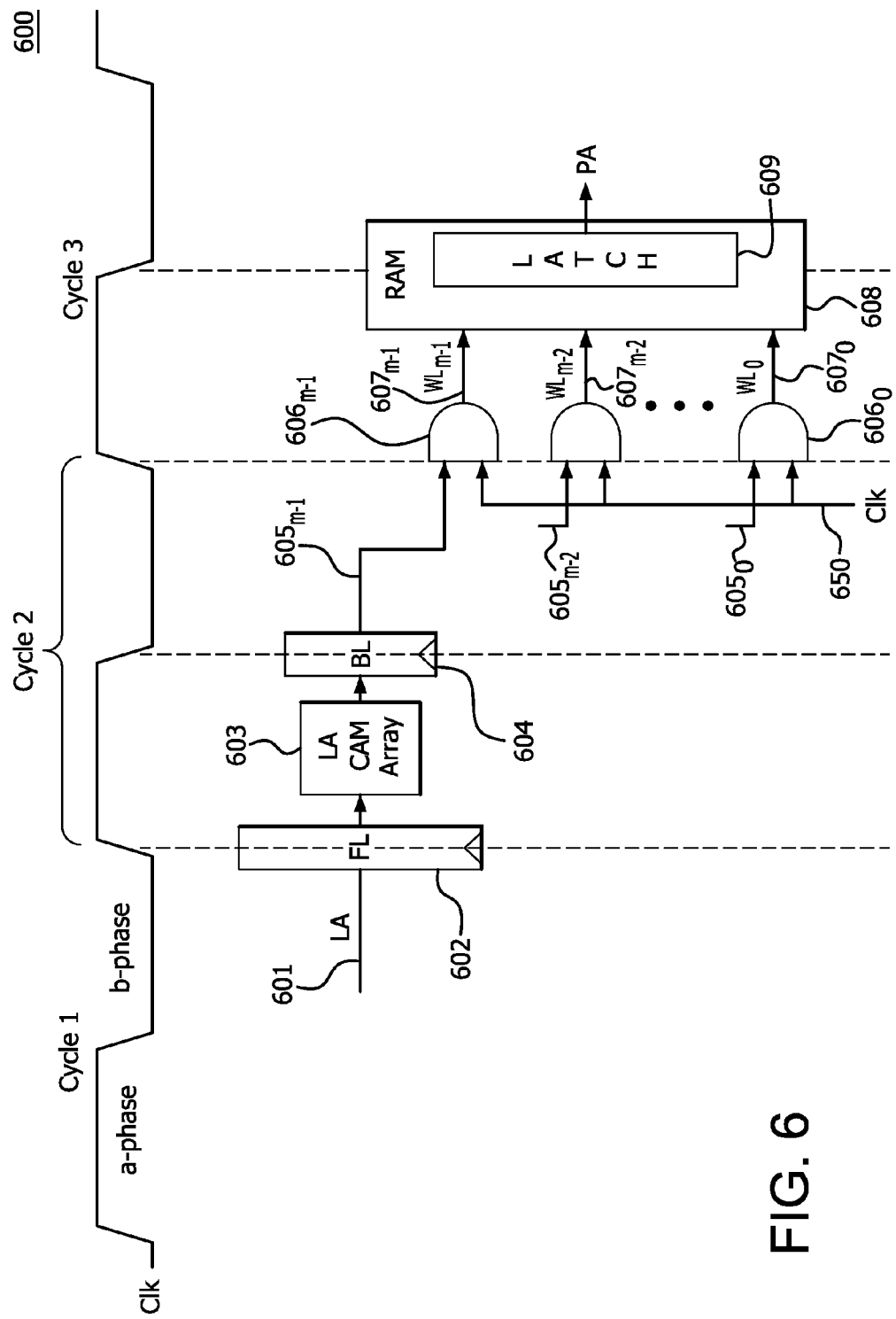
FIG. 6 is an embodiment of a TLB.

FIG. 6 schematically shows an embodiment of the operation of a TLB 600. A LA 601 is received in cycle 1 from a processor, a load and store unit, or any one unit requesting a LA-to-PA translation. The LA 601 enters a flip-flop 602, denoted as FL in FIG. 6, which is, for example, a rising edge delay flip-flop (D flip-flop) at the beginning of cycle 2. Then, a content addressable memory (CAM) search is performed in cycle 2 to determine whether the received LA 601 is among the set of LAs for which the TLB retains a LA-to-PA translation.

For every LA that TLB 600 can translate into a PA there is an associated CAM array 603 entry. These CAM array 603 entries are searched to determine whether the received LA is among them. Naturally, this search is content-based as opposed to being address-based. In the content-based search, the received LA is compared against the CAM array 603 entries to determine whether there is a CAM array match. This memory is content-addressable, since unlike a conventional Random Access Memory (RAM) in which a memory address is supplied and the RAM provides the data associated with the address, a CAM is provided with data (a LA of a certain number of bits) and memory content is searched to determine whether the data exists in memory. CAM may be a static CAM and may comprise static RAM cell storage with static match tree logic. Match tree logic is used in determining whether a CAM array match exists. Further, a CAM may also use flip-flops or latches as storage elements, or may be dynamic with dynamic pulldown match lines.

When a received LA matches an existing CAM array 603 entry, an output of "1" corresponding to the matched LA will be latched to b-latch 604, denoted as BL in FIG. 6, in the b-phase of cycle 2. The b-latch 604 is a falling edge latch. Thereafter, the output corresponding to the matched CAM array 603 entry may be outputted via any of lines $605_0$-$605_{m-1}$ to any of AND gates $606_0$-$606_{m-1}$, respectively, at the start of cycle 3. Lines $605_0$-$605_{m-1}$ will combine with a clock signal 650 at AND gates $606_0$-$606_{m-1}$, where at the start of cycle 3 one of the Word Line (WL) signals, $WL_0$ $607_0$-$WL_{m-1}$ $607_{m-1}$, corresponding to the matched LA will be asserted (by an output of "1"). The PA that corresponds to the asserted WL and therefore also corresponds to the input LA 601 is then read from RAM 608 and outputted to latch 609 where it is held to complete the translation. In some embodiments, latch 609 is a glitch latch where the PA is made available for reading in the a-phase of cycle 3. The glitch latch may be reset using a clock signal 650 at the beginning of next clock cycle in order for it to be ready to hold the next translated PA in the a-phase of that cycle. In alternative embodiments, however, another type of latch may be used.

When a CAM match exists between the received LA and the LAs that TLB 600 can translate, then a corresponding word line (WL) 607 is flagged at the beginning of cycle 3 so that the PA is retrieved from random access memory (RAM) 608. In the embodiment of FIG. 6, m word lines are represented—one for every word line read possible, which also corresponds to the number of translations TLB 600 can perform. The retrieved PA is placed onto glitch latch 609 in the a-phase of cycle 3.

The RAM 608 holding the PAs corresponding to the LAs may be an SRAM cell with dynamic pulldown read bitlines, but may also be any other type of memory. The SRAM may for instance be a register file cell array.

In the TLB 600 of FIG. 6, power is consumed in accessing the RAM 608 and placing the resulting PA in the glitch latch 609. For instance, if dynamic pulldown is employed, power is consumed in precharging and discharging read bitlines, as well as resetting and setting of the glitch latch 609. The read bitlines discharge in the a-phase of cycle 3 when read wordline $606_0$-$606_{m-1}$ is asserted. Thereafter, read bitlines are precharged in the b-phase of cycle 3. Given, that the TLB 600 is used every time a processor wishes to acquire data from a memory address that requires LA-to-PA translation, power can be saved by reducing requests for PAs stored in the RAM 608 and thus reducing the number of wordline reads from the RAM 608.

Even if the power consumption incurred in reading a TLB RAM may seem small compared to power consumed in the running of a processor, it is useful to consider that a TLB may be accessed for address translation every time a processor requires data from memory. Therefore, power consumed in a TLB RAM may add to a significant portion of the power consumed by a processor. Because of the power consumption associated with TLB RAM, the operation of the TLB as subsequently described may provide a benefit in reducing power consumption.

Memory access in a processor is temporally and spatially localized. Temporal locality implies that when a processor accesses a memory address in memory, it will soon access that memory address again, while spatial locality implies that when a processor accesses one memory address it will also access memory addresses of nearby locations in the near future. Many of these nearby locations will fall in the same memory page. Therefore, a TLB oftentimes translates a LA to a PA when, in fact, the same translation has just been performed.

As discussed herein, TLB 600 frequently performs wordline reads from RAM 608, where a previously requested wordline 607 is the same as the next requested wordline 607. That is, a TLB will often unnecessarily perform a wordline read on RAM 608 and place the requested PA in latch 609, when during the previous cycle the same has already been done. Therefore, a TLB may reduce its power consumption by refraining from reading RAM 608 when performing two identical and consecutive translations and instead maintains the output of latch 609 over the two translations.

Figure 7:
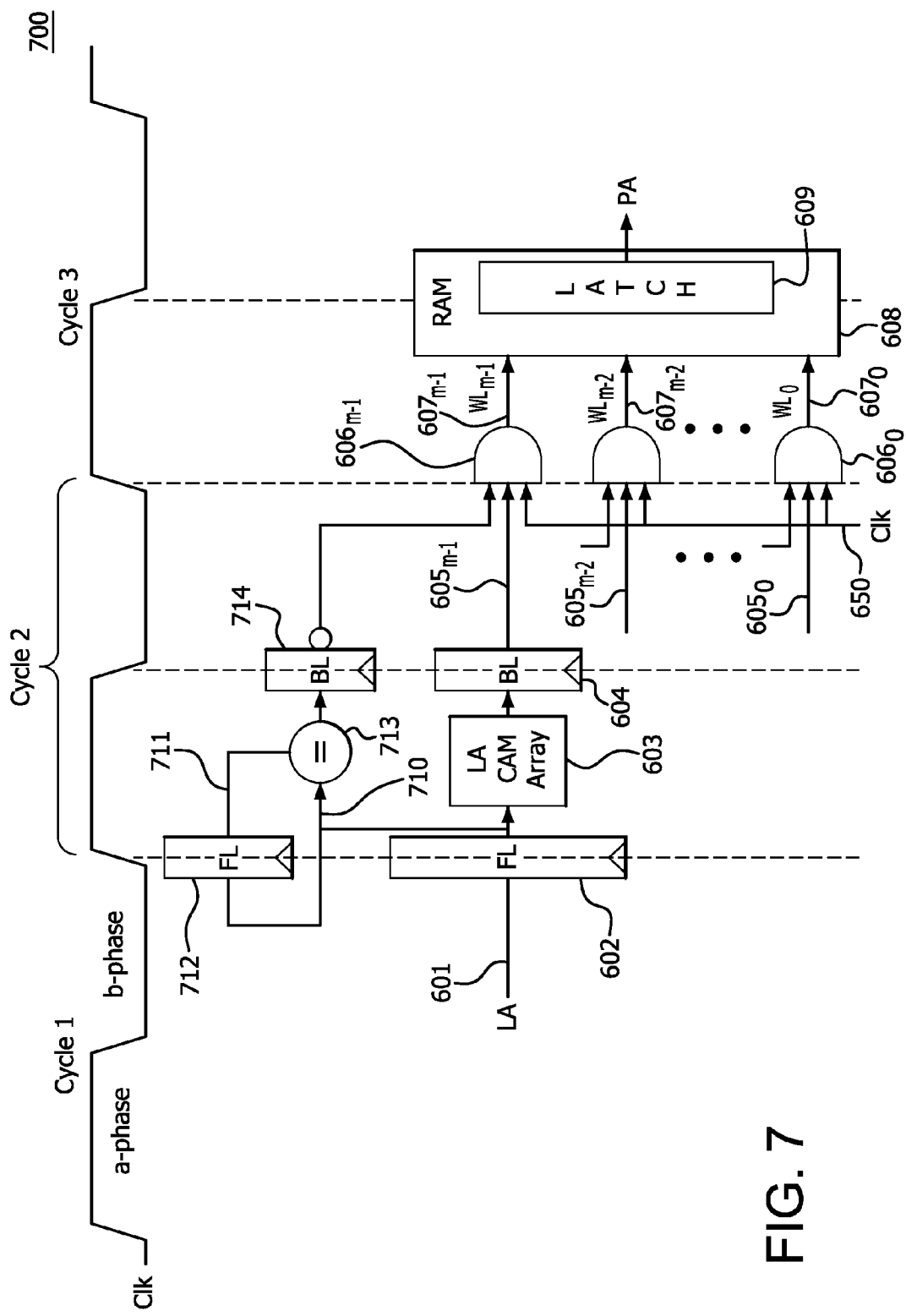
FIG. 7 is an embodiment of a power filter in a TLB.

FIG. 7 schematically shows an embodiment of a TLB 700 using a power filter to reduce unnecessary reading of its RAM 608. In this embodiment, the LA of the previous cycle 711, which has been passed through a D flip-flop 712, is compared with the currently requested LA 710 using an equator 713. If the equator 713 shows a match between the currently requested LA 710 and the previously requested LA 711, then the output of the equator will be "high", or a "1". The output is latched and negated using a negated b-latch 714 and subsequently used as an input to AND gate 606 to suppress reading the wordline from the RAM 608. Under this embodiment, instead of reading the same PA from the RAM 608 two times in a row, the subsequent reading is suppressed and the output of glitch 609 is maintained as the previous output. Power savings are accomplished since reading a RAM 608 is a power consuming task.

In the embodiment of FIG. 7, any one of read wordlines $607_0$-$607_{m-1}$ is asserted at the beginning of the a-phase of cycle 3 when a LA CAM array 603 match exits. Further, in this embodiment, the corresponding PA is read from the RAM in the a-phase of cycle 3 and thereafter latched onto latch 609. The PA is then available as an output of latch 609 in the a-phase of cycle 3.

In some embodiments, the RAM 608 may be a static RAM with dynamic pulldown read bitlines, where the read bitlines of RAM 608 discharge in the a-phase of cycle 3 for the PA to be read out and are thereafter recharged in b-phase of cycle 3 so that the next translated PA may be read out again in the a-phase of the next clock cycle using dynamic pulldown. The recharging of the read bitlines may be based on a clock signal which triggers the recharging in the b-phase of the clock.

However, if two consecutive LAs are the same, as indicated by equator 713, and, therefore, the corresponding read wordline 607 have been suppressed, then it is important for the bitlines to remain pre-charged. Whereby, when the PA corresponding to an LA has been read from the RAM in the a-phase of a clock cycle and the bitlines have been precharged in the b-phase of the clock cycle, then it may be necessary to keep the bitlines precharged during the a-phase of the next clock cycle. The clock signal triggering the turning off of the precharging in the a-phase of the clock corresponding to the matching LA may be suppressed to accomplish this. That is, the bitlines of the dynamic pulldown remain precharged while the read wordlines 607 are suppressed.

Similarly, in some embodiments, latch 609 is a glitch latch which maintains the translated PA as an output in the a-phase cycle 3. This glitch latch is reset at the beginning of the next cycle using a clock signal. Therefore, when two consecutive LAs are the same, as indicated by equator 713, it is important to prevent the glitch latch from resetting so as to maintain the output of the glitch latch over the two translations. In these embodiments, when two consecutive LAs are the same, the clock signal triggering the glitch latch to reset is suppressed in order for the glitch latch to maintain its PA output over the next requested translation.

Although, in the embodiment of FIG. 7, it is shown that a LA is received in the b-phase of cycle 1 and its corresponding PA is outputted in the a-phase of cycle 3 any other timing arrangement for TLB operation is within the scope of the embodiments described herein.

In the embodiment of FIG. 7, the previously translated linear address 711 is compared with the currently received linear address 601 without affecting the timing requirement of the TLB 700, whereby the comparison of the two addresses does not require any additional clock cycles to perform. However, due to the imposed timing requirement in the TLB 700, the CAM array 603 is searched for a LA match regardless of whether the previous LA and the current LA are the same. In some embodiments, it may be contemplated that when the previous address is the same as the current address, a CAM array 603 match search is not performed in order to reduce the power consumed by the TLB 700 in searching the CAM array 603. That is, when a CAM array 603 match exists, the CAM array 603 match search is suppressed as well as reading the PA from the RAM 608.

Figure 8:
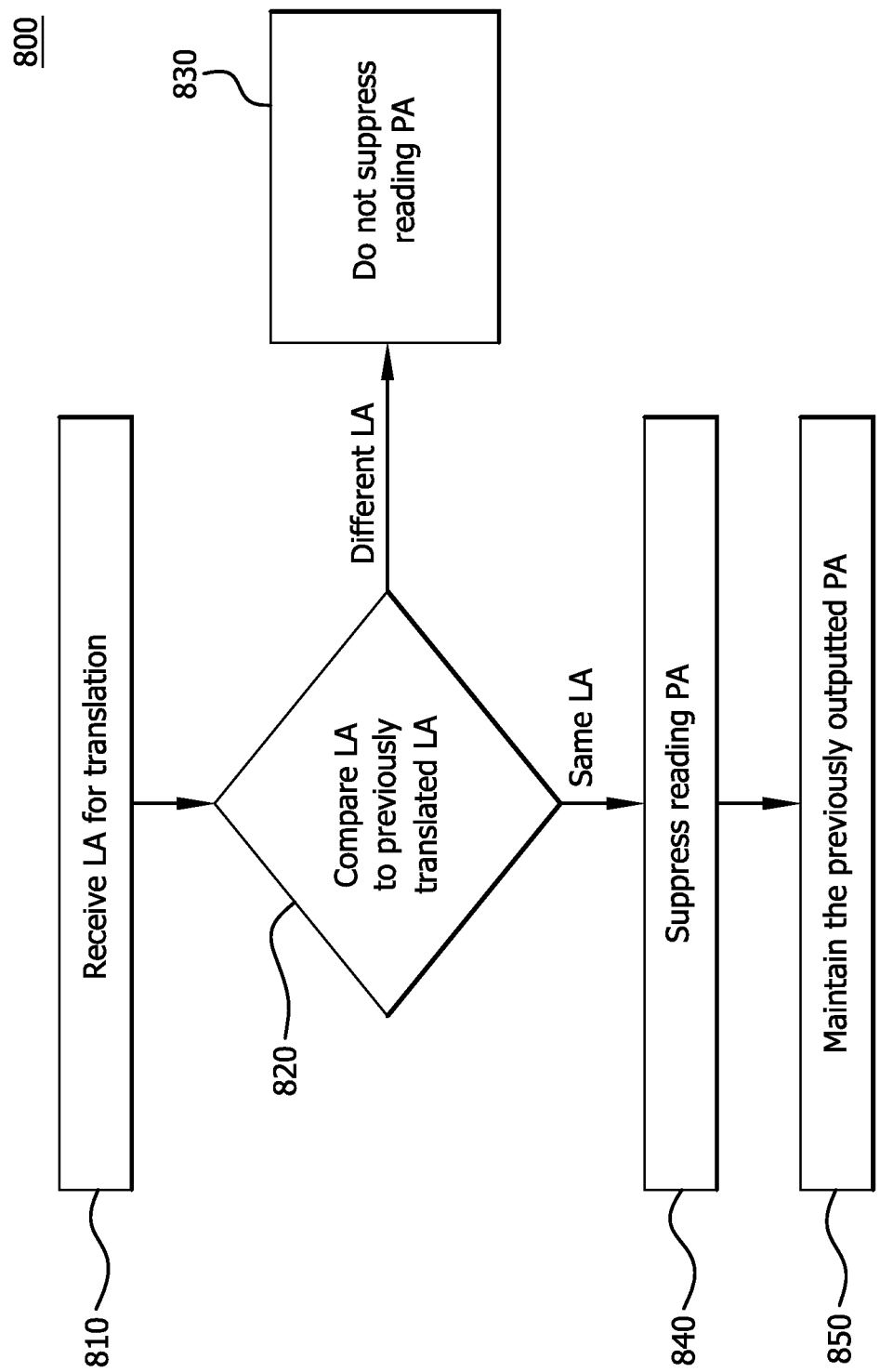
FIG. 8 is a block diagram of a method for a power filter in a TLB.

FIG. 8 is a flow chart of a method in accordance with the described details herein. In the method 800, a LA is received for translation 810 and the LA is compared to the previously translated LA 820. If the requested LA and the previously translated LA are different, then reading the PA is not suppressed 830. However, if the requested LA is the same as the previously translated LA, then reading the PA is suppressed 840 and the previously outputted PA is maintained 850.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of processors, one or more processors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A method for reducing power consumption in memory address translation, the method comprising:
    maintaining a physical address (PA) corresponding to a previously translated linear address (LA) as an output if the previously translated LA is the same as a received LA;
    and suppressing reading of a PA corresponding to the received LA if the previously translated LA is the same as the received LA, wherein a reset clock signal is suppressed to maintain the PA.

2. The method of claim 1 wherein comparing the received LA with a previously translated LA comprises:
    delaying the previously translated LA by a clock cycle;
    comparing the previously translated LA with the received LA to determine if they are the same.

3. The method of claim 1, wherein a Static Random Access Memory (SRAM) is used for storing PA translations.

4. The method of claim 3, wherein the SRAM has dynamic pulldown read bitlines.

5. The method of claim 1, wherein LAs which are capable of being translated by the TLB are held in a content addressable memory (CAM).

6. The method of claim 5, wherein the CAM has an entry for every LA capable of being translated.

7. The method of claim 1, wherein memory address translation is performed by a Translation Look-aside Buffer (TLB).

8. A memory address translation device comprising:
    circuitry configured to maintain a physical address (PA) corresponding to a previously translated linear address (LA) as an output if the previously translated LA is the same as a received LA: and
    circuitry configured to suppress reading of a PA corresponding to the received LA if the previously translated LA is the same as the received LA,
    wherein a reset clock signal is suppressed to maintain the PA.

9. The memory address translation device of claim 8 further comprising circuitry configured to store linear addresses (LAs) capable of being translated by the memory address translation device and circuitry configured to store physical address (PA) translations corresponding to the LAs.

10. The memory address translation device of claim 8 further comprising a content addressable memory (CAM) for storing linear addresses (LAs) capable of being translated and a random access memory (RAM) for storing physical address (PA) translations corresponding to the LAs.

11. The memory address translation device of claim 10, wherein the RAM is a Static Random Access Memory (SRAM) with dynamic pulldown read bitlines, and the CAM is an SRAM-type cell for storage with static match tree logic per entry.

12. The memory address translation device of claim 8 further comprising circuitry configured to delay the previously translated LA by a clock cycle and to compare the previously translated LA with received LA to determine if they are the same.

13. A computer system comprising:
    a processor including circuitry configured to maintain a physical address (PA) corresponding to a previously translated linear address (LA) as an output if the previously translated LA is the same as a received LAI and
    circuitry configured to suppress reading of a PA corresponding to the received LA if the previously translated LA is the same as the received LA,
    wherein a reset clock signal is suppressed to maintain the PA.

14. The computer system of claim 13 further comprising a content addressable memory (CAM) for storing LAs capable of being translated and a random access memory (RAM) for storing PA translations corresponding to the LAs.

15. The computer system of claim 13 further comprising circuitry configured to delay the previously translated LA by a clock cycle and compare the previously translated LA with received LA to determine if they are the same.

16. A non-transitory computer-readable storage medium storing a set of instructions for execution by one or more processors to reduce power consumption in a Translation Look-aside Buffer (TLB), the set of instructions comprising:
    a maintaining code segment for maintaining a physical address (PA) corresponding to a previously translated linear address (LA) as an output if the previously translated LA is the same as a received LA; and
    a suppressing code segment for suppressing reading of a PA corresponding to the received LA if the previously translated LA is the same as the received LA,
    wherein a reset clock signal is suppressed to maintain the PA.

17. The non-transitory computer readable storage medium of claim 16, wherein the set of instructions are hardware description language (HDL) instructions used for the manufacture of a device.

* * * * *

UNITED STATES PATENT AND TRADEMARK OFFICE
CERTIFICATE OF CORRECTION

PATENT NO. : 8,788,789 B2
APPLICATION NO. : 12/968613
DATED : July 22, 2014
INVENTOR(S) : Kapil et al.

It is certified that error appears in the above-identified patent and that said Letters Patent is hereby corrected as shown below:

IN THE CLAIMS:

In claim 13, column 8, line 30, change "LAI" to -- LA; --.

Signed and Sealed this
Fourteenth Day of October, 2014

Michelle K. Lee
*Deputy Director of the United States Patent and Trademark Office*